UNITED STATES PATENT OFFICE.

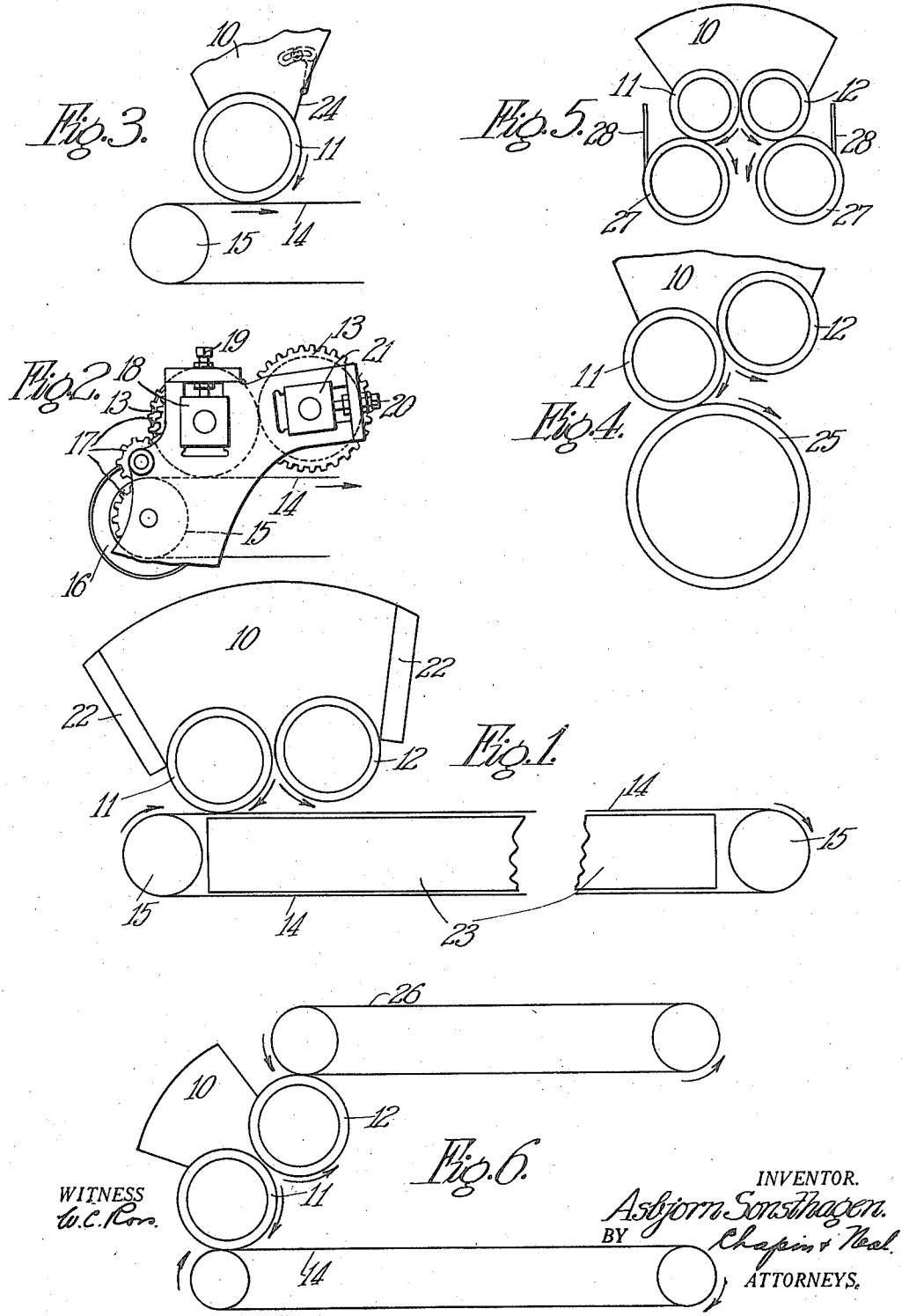

ASBJÖRN SONSTHAGEN, OF WEST EALING, ENGLAND.

FEEDING AND DISTRIBUTING APPARATUS.

1,249,294.  Specification of Letters Patent.  Patented Dec. 4, 1917.

Application filed September 19, 1917. Serial No. 192,234.

*To all whom it may concern:*

Be it known that I, ASBJÖRN SONSTHAGEN, a subject of the King of Norway, residing at West Ealing, England, have invented certain new and useful Improvements in Feeding and Distributing Apparatus, of which the following is a specification.

This invention relates to improvements in feeding and distributing apparatus and more particularly to apparatus wherein materials of varying viscosity, such as sugar, cream for confectionery, oils, fats, cream, and the like may be taken in bulk and reduced to the condition of a layer or film preparatory to any desired subsequent treatment, such as cooling, heating, mixing, drying, roasting, and like operations.

According to one feature of the invention, two movable bodies are employed, one of which is adapted to move at a much higher speed than the other, and material is supplied to the relatively slow moving body in a film of regulable thickness and is picked from the latter by the fast traveling body and drawn out into a film of reduced thickness, the arrangement being characterized in that the thickness of the film may be controlled within close limits and may be readily varied within wide limits.

According to another feature of the invention, the material is fed from a hopper by a feed roll and an element coöperates with the latter to regulate the thickness of the film of material produced on the feed roll. The latter is movable in close proximity to a conveying member, such as a roll, drum, or endless band, and the conveying member, which moves at higher speed than the feed roll and in an opposite direction thereto at the meeting point, takes the film from the feed roll and draws it out into a film of less thickness.

According to another feature of the invention, two oppositely driven feed rolls are employed, and the relative speed of these rolls is such that only one roll, the one moving at the highest speed, receives a coating of the material and transfers it to a body movable in close proximity to the coated feed roll, at higher speed, and in a direction opposite to that of the feed roll at the point of transfer.

According to another feature of the invention, two feed rolls are arranged in close proximity and are driven in opposite directions at such relative speeds that both receive a coating of material from the hopper, and a conveying means is provided for each feed roll to take the film therefrom.

Other features of the invention will appear in the following description and in the illustrative embodiment of the invention in the accompanying drawing, in which—

Figure 1 is a diagrammatical view of an apparatus embodying the invention;

Fig. 2 is a fragmentary view, illustrative of an arrangement for driving and adjusting the movable parts shown in Fig. 1; and Figs. 3, 4, 5, and 6 are diagrammatical views showing modifications of the invention.

Referring to these drawings, and particularly to Figs. 1 and 2, a hopper 10 is arranged to receive the material and is closed at the bottom by a pair of feed rolls 11 and 12. The latter are driven in opposite directions in any suitable manner, as by intermeshing gears 13, and, as shown in Fig. 2, roll 12 is preferably arranged to rotate at slower speed than roll 11. A conveyer, such as the endless band 14, which may be made of thin sheet metal or other suitable material, is mounted on drums or pulleys 15 and is arranged to move beneath the feed roll 11 and in close proximity thereto. The latter may be driven from any suitable source of power from a pulley 16 and is preferably connected by gears 17, as indicated in Fig. 2, to drive the gear connected feed rolls 11 and 12. The driving connections, as indicated in Fig. 2, are such that conveyer 14 moves at higher speed than roll 11, and the latter and conveyer 14 move in opposite directions at their meeting point.

The roll 11 is suitably mounted for adjustment relatively to the conveyer 14, as for example, in slidable bearings 18 which may be raised or lowered by adjusting screws 19, as will be obvious from Fig. 2. The roll 12 may also be moved toward or away from roll 11 to vary the space between the rolls, as by adjusting screws 20, which are arranged as indicated in Fig. 2, to move slidable bearings 21 which rotatably support roll 12. In practice, the space between rolls 11 and 12 is adjusted to regulate the thickness of the film formed on roll 11, and the latter is adjusted relatively to conveyer 14 so that it barely touches the latter, although by the adjustment illustrated in Fig. 2, it may be otherwise positioned, as slightly above the conveyer for the purpose of depositing a film upon another previously formed film or other article on the conveyer.

The hopper 10 is provided with a jacket 22 to permit the circulation of a heating material about the hopper whenever it is necessary or desirable so to do, as when the material is such as to require heating to render it sufficiently fluid. The rolls 11 and 12 are shown as hollow and are adapted to be heated or not, depending on the character of the material being treated. Between the upper and lower travels of the conveyer is a chamber 23, substantially coextensive with the belt, which chamber may be filled with, or in which may circulate, a suitable cooling medium for the purpose of cooling and hardening the film deposited on the conveyer.

The essential elements of the invention consist in a movable body with means cooperating therewith to produce a film of regulable thickness on the body, and a conveying means movable at a higher speed than the body and in close proximity to the latter, together with the arrangement whereby the conveying means and body move in opposite directions at their meeting point. Obviously, the invention may be embodied in other forms than that shown in Fig. 1 as the necessities of the case or the nature of the material may require.

For example, one of the feed rolls, as roll 12, may be replaced by a breast plate 24, as shown in Fig. 3, provision being made, as indicated, to regulate the space between the roll and plate, preferably, although not necessarily, by moving the plate. Similarly the conveying means need not necessarily take the form of the endless band shown but may be, for example, a drum or roll, such as indicated by 25 in Fig. 4. Furthermore, the heating arrangement for the hopper and rolls, although shown as desirable in some instances, need not be used unless the material is of such a nature as to require heating to render it fluid to the desired degree.

I have found that when the speed of one feed roll is in excess of the other that only one roll, that which moves at the higher speed, will receive a coating, particularly when the material is of a viscous nature, and accordingly only one feed roll has been illustrated in Fig. 1 as delivering to the conveying means. Although this is the preferable arrangement, the rolls 11 and 12 may be driven at the same speed in which case each will then receive a coating and a second conveying means 26 may be provided to receive the film from roll 12, as clearly shown in Fig. 6. Again the conveying means may take the form of rolls or drums, as shown in Fig. 5. Here the feed rolls 11 and 12 deliver separate films upon rolls 27.

It is not to be understood that, when the rolls 11 and 12 move at the same speed, each will under all conditions receive a perfect coating of material. The perfect coating of both rolls depends largely on the character of the material being handled, and with certain viscous materials it is possible to obtain perfect coatings on each. With other materials a perfect film of unvarying thickness cannot always be relied upon, but this fact does not necessarily destroy the utility of the arrangement for all purposes. Thus, in many instances, the film is formed simply for the purpose of drying materials, to which changes of temperature are not important, to produce a powder and obviously for such purposes absolute continuity and unvarying thickness of the film is not an essential. The apparatus shown in Fig. 5 is suitable for the rapid drying of the films produced by the feed rolls 11 and 12, as the conveying means 27 are adapted for heating as are also the feed rolls 11 and 12. Each of the latter produces a separate film and transfers it to the roll 27 and during the passage of the material through the apparatus it is dried by the heated rolls. The dried films on drums 27 may be removed by any suitable means as by scrapers 28, whereby a powder is formed. The apparatus may, of course, be used for other purposes, as to heat the material just sufficiently to drive off certain constituents therein in order to increase its viscosity or to recover the said constituents.

In the operation of my apparatus in its preferred form, the material in hopper 10 passes between the feed rolls 11 and 12 and is spread upon one or both, depending on the relative speed with which they are driven, in the form of a layer or film of substantially uniform thickness. The feed roll 11 moves slowly with relation to the conveying means and in such proximity to the latter that the film is picked from the feed roll 12 by the conveyer. This results in drawing out the film into a still thinner film, the thickness of which may be regulated as desired by adjusting the speed of the conveyer to that of the feed roll. The film spread upon the conveyer travels over the cooling chamber 23 and is hardened thereby or the film, when of certain characteristics, may be dried by heating instead of cooling, for example, as shown in Fig. 5.

An important feature of the invention lies in the control, which is to be had over the thickness of the film produced. The thickness of the film formed on the feed rolls may be regulated within close limits by the adjustments provided, and the thickness of the film on the feed roll may be still further reduced to an extent dependent wholly on the relative speed between the feed roll and the conveyer, and it is readily possible to produce a film which is substantially one one-thousandth of an inch in thickness and from this thickness upward within wide limits.

The invention has been described in a preferred embodiment with detailed variations for the purposes of illustration, but the scope of the invention is defined by the appended claims rather than by the foregoing description.

What I claim is—

1. A feeding and distributing apparatus, comprising in combination, a container for the material to be fed, a movable element to which the material is supplied, a part coöperating with said element to produce a layer of material thereon and regulate the thickness of the layer, and a conveying means movable in close proximity and in an opposite direction to said element at the meeting point, said conveying means being so arranged as to remove the layer of material from said element and draw it out into a layer of reduced thickness.

2. A feeding and distributing apparatus comprising, in combination, a container for the material to be fed, a movable element to which the material is supplied, a part coöperating with said element to produce a layer of material thereon and regulate the thickness of the layer, and a conveying means movable in close proximity to and at a higher speed than said element, the latter and the conveying means being arranged to move in opposite directions at their meeting point, all constructed and arranged so that the layer on said element is picked therefrom by the conveying means and drawn out into a layer of reduced thickness.

3. A feeding and distributing apparatus, comprising, a movable element arranged to receive the material and convey it in a layer, a part coöperating with said element to regulate the thickness of the layer, and a conveying means movable in close proximity to and at higher speed than said element, the latter and the conveying means being arranged to move in opposite directions at their meeting point, all constructed and arranged so that the layer on said element is picked therefrom by the conveying means and drawn out in a layer of reduced thickness.

4. In an apparatus of the class described, a movable feed roll arranged to receive material and convey it in film form, a second roll movable at a different speed than the feed roll and coöperating therewith to regulate the thickness of said film, and a conveying means movable in close proximity to and at higher speed than said feed roll, the latter and the conveying means being arranged to move in opposite directions at their meeting point, all constructed and arranged so that the layer on said element is picked therefrom by the conveying means and drawn out in a layer of reduced thickness.

5. In an apparatus of the class described, two oppositely driven rolls movable at different speeds, the relatively fast traveling roll arranged to receive material and convey it in film form, the relatively slow traveling roll coöperating with the relatively fast traveling roll to regulate the thickness of said film, and a conveying means movable in close proximity to and at higher speed than the relatively fast traveling roll, the latter and the conveying means being arranged to move in opposite directions at their meeting point, all constructed and arranged so that the layer on the relatively fast traveling roll is picked therefrom by the conveying means and drawn out in a layer of reduced thickness.

6. In an apparatus of the class described, two oppositely driven rolls each arranged to receive material and convey it in film form, means to vary the space between said rolls to regulate the thickness of the films thereon, and a conveying means movable in close proximity to and at higher speed than each roll, each conveying means and its roll arranged to move in opposite directions at their meeting point.

7. A feeding and distributing apparatus, comprising, in combination, a container for the material to be fed, a movable element to which the material is supplied, a part coöperating with said element to produce a layer of material thereon and regulate the thickness of the layer, a conveying means movable in close proximity to and at a higher speed than said element, the latter and the conveying means being arranged to move in opposite directions at their meeting point, all constructed and arranged so that the layer on said element is picked therefrom by the conveying means and drawn out in a layer of reduced thickness, and means to cool the last-named layer.

8. A feeding and distributing apparatus, comprising in combination, a container for the material to be fed, a movable element to which the material is supplied, a part coöperating with said element to produce a layer of material thereon and regulate the thickness of the layer, and a conveying means movable in close proximity to and at a higher speed than said element, the latter and the conveying means being arranged to move in opposite directions at their meeting point, all constructed and arranged so that the layer on said element is picked therefrom by the conveying means and drawn out in a layer of reduced thickness, and means to heat the material before it is transferred to said conveying means.

9. In an apparatus of the class described, a movable feed roll arranged to receive material and convey it in film form, a second roll movable at a different speed than the feed roll, means to move said rolls the one relatively to the other to regulate the thickness of said film, and a conveying means movable in close proximity to and at higher speed than said feed roll, the latter and the conveying means being arranged to move in opposite directions at their meeting point, all constructed and arranged so that the layer on said element is picked therefrom by the conveying means and drawn out in a layer of reduced thickness.

10. In an apparatus of the class described, a movable feed roll arranged to receive material and convey it in film form, a second roll movable at a different speed than the feed roll, means to move said rolls the one relatively to the other, to regulate the thickness of said film, a conveying means movable in close proximity to and at higher speed than said element, the latter and the conveying means being arranged to move in opposite directions at their meeting point, all constructed and arranged so that the layer on said element is picked therefrom by the conveying means and drawn out in a layer of reduced thickness, and means to move said feed roll and conveying means the one relatively to the other to vary the space therebetween.

In testimony whereof I affix my signature in the presence of two witnesses.

ASBJÖRN SONSTHAGEN.

Witnesses:
H. BROCKBANK,
EDMUND H. HARBERD.